United States Patent [19]
Sena

[11] 3,901,494
[45] Aug. 26, 1975

[54] AUXILIARY VEHICLE SPRING INSTALLATION

[76] Inventor: Ernest H. Sena, 510½ S. Magnolia, Monrovia, Calif. 91016

[22] Filed: Oct. 29, 1973

[21] Appl. No.: 410,537

[52] U.S. Cl............. 267/61 R; 267/33; 280/124 R
[51] Int. Cl............................................ B60g 11/14
[58] Field of Search............ 267/33, 61; 280/124 R, 280/81 R

[56] References Cited
UNITED STATES PATENTS

| | | | |
|---|---|---|---|
| 2,352,446 | 6/1944 | Pointer | 267/33 |
| 2,980,417 | 4/1961 | Fence | 267/33 |
| 3,532,357 | 10/1970 | Williams et al. | 280/124 R |
| 3,638,963 | 1/1972 | Von Leeuwen | 280/124 R |
| 3,797,852 | 3/1974 | Patterson | 267/61 R |

*Primary Examiner*—James B. Marbert
*Attorney, Agent, or Firm*—Boniard I. Brown

[57] ABSTRACT

An auxiliary coil spring installation for vehicles having coil springs for improving stability in load-carrying capability of the vehicle. Coil springs are installed outwardly or outboard of the regular coil springs of the vehicle. The auxiliary coil springs are supported directly on the axle shaft housing and are retained at their upper ends by particularly shaped spring retainer brackets installed by being bolted to available brackets on the sides of the chassis frame members.

8 Claims, 4 Drawing Figures

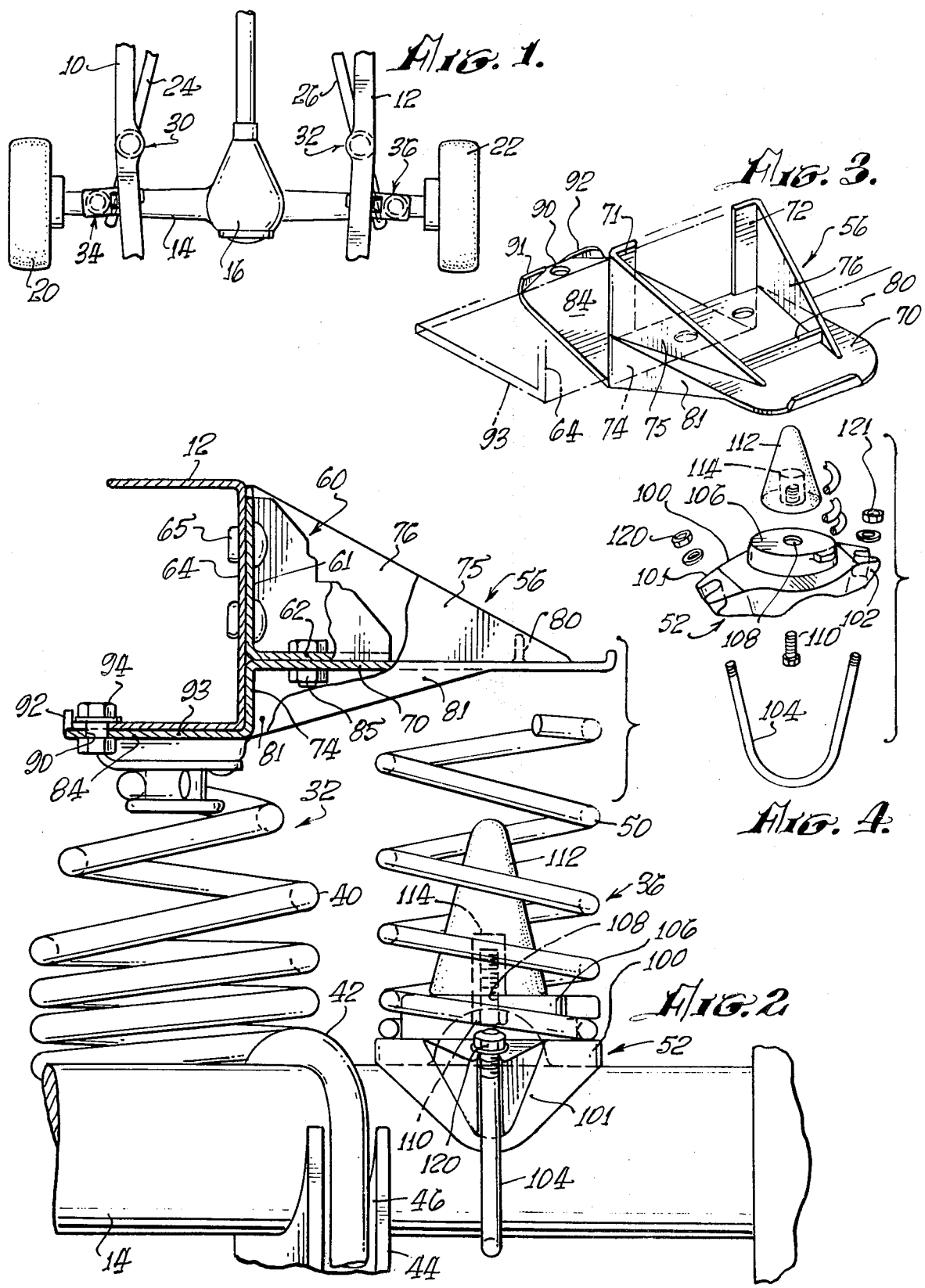

3,901,494

AUXILIARY VEHICLE SPRING INSTALLATION

SUMMARY OF THE INVENTION

The invention is an auxiliary coil spring installation for vehicles. The invention is adaptable for various vehicles but more particularly to General Motors half-ton trucks which have rear coil springs, especially those produced from the years 1963 to 1972. These vehicles are equipped with rear coil springs which are only a limited distance apart and approximately twelve inches in front of the rear axle. Such vehicles if equipped as campers are unstable, particularly when subjected to a side wind and this is true it has been found by reason of the relative positions of the rear coil springs. The load-carrying capability of these vehicles with these particular springs is limited and leaves something to be desired.

It has been discovered that an auxiliary coil spring installation can be made and this discovery has been implemented by way of particular means or installation as described in detail herein. In the preferred exemplary form of the invention additional coil springs are installed which are directly over the rear axle housing and supported thereon in a position outwardly or outboard of the regular coil springs. Particular spring seats for retainers are provided clamped on to the rear axle housing on which the auxiliary springs rest. The auxiliary springs are retained at the upper end by particular simplified brackets which are attachable to the brackets already available on the sides of the box frame members of the vehicle. The installation is thus simplified and made easy not requiring any particular tooling or fabrication of additional parts other than those mentioned.

With respect to known prior art relating to auxiliary spring installations, reference is made to the following patents: U.S. Pat. Nos. 1,111,675; 1,300,783; 2,466,384; 2,746,764; 2,411,852 and 2,980,417.

The primary object of the invention is to realize a simplified coil spring installation as referred to adapted for use with the particular vehicles mentioned which realizes the purpose of overcoming the lack of stability referred to and improving the load-carrying capability.

A further object is to provide auxiliary spring installation as described comprising coil springs supported directly on the rear axle housing outboard of the regular springs and retained at the top by brackets secured by being bolted to brackets already available on the sides of the box frame members.

A further object is to provide a lower spring retainer in the form of a saddle secured to the axle shaft housing by way of a shackle and having a cylindrical spring retainer product to receive the lower end of a coil spring.

Another object is to provide an assembly as in the foregoing object including a spring loading bracket having vertical and horizontal parts attachable respectively to the side and the bottom of the box frame of the vehicle.

Further objects and additional advantages of the invention will become apparent from the following detailed description and annexed drawings wherein:

FIG. 1 is a partial schematic view of the rear part of the chassis and rear axle housing of a vehicle of the type referred to in the foregoing;

FIG. 2 is an enlarged view illustrating the installation of one of the auxiliary coil springs;

FIG. 3 is a perspective view of one of the upper support brackets or spring holders;

FIG. 4 is an exploded view illustrating the spring seat or saddle supported on the axle housing for retaining the lower end of the auxiliary spring.

Referring now more particularly to the drawings in FIG. 1 numerals 10 and 12 designate frame members in the type of vehicle as referred to in the foregoing. The rear axle housing is designated at 14 and the differential at 16, the rear wheels being designated at 20 and 22. Numerals 24 and 26 are also frame members.

Typically the regular rear springs of the vehicle are coil springs and they may be mounted in positions as indicated at 30 and 32 slightly forward of the rear axle. On the other hand, these regular springs may be mounted directly over the rear axle housing and between the housing and the frame members 10 and 12. The herein invention is adaptable in vehicles wherein the regular rear coil springs are in either of the positions as just described.

In FIG. 1 the auxiliary coil springs are mounted in positions as designated by the numerals 34 and 36.

FIG. 2 illustrates preferred exemplary installation of one of the springs in a vehicle wherein the regular spring is a coil spring and designated at 40 mounted directly over the rear axle. The frame member 12 is a box type member as previously described. The lower end or convolution of the spring 40 rests on frame member 26 (FIG. 1) U-bolt 42 fastens frame member 26 to axle 14 by means of a conventional bracket or hanger member 44 which has a groove 46 to receive the U-bolt.

The auxiliary coil spring is designated at 50. At its lower end it is retained in spring retainer or saddle member 52, the details of which are illustrated in the exploded view of FIG. 4. The upper end of the auxiliary spring 50 is held or retained by way of an upper spring holder or retainer bracket 56 which is illustrated in detail in FIG. 3.

Numeral 16 designates a right angle bracket having a vertical part 60 and a horizontal part 62 as shown, there being integral reinforcing or braced parts at the sides between the vertical and horizontal portions. The vertical part of the bracket 60 is bolted to a side wall 64 of the box frame 12 by bolts, one of which is designated at 65.

The upper spring retainer or holder 56 is secured to the bracket 60 as will be described.

FIG. 3 shows the preferred configuration or shape of the upper spring retainer holder. It has a flat surface part 70 and vertical portions 71 and 72 which extend upwardly from the part 70, and also has downwardly extending vertical part 74 in the same plane as the parts 71 and 72. Numerals 75 and 76 designated integral reinforcing braces or trusses extending between the upright parts 71 and 72 and the flat parts 70. Between these braced members is a further reinforcing brace member 80 extending transversely. There are also integral reinforcing braces or truss members like those shown at 81 extending between the vertical parts of the floor and the flat platform part 70. Bracket or holder 56 has a further inwardly extending horizontal part 84 that extends inwardly from the vertical part 74. The platform part 70 of the bracket 76 is secured to the horizontal part 62 of bracket 16 by bolts shown at 85 and as previously pointed out it is secured to the side wall 64 of box spring member 12 by bolts. At the extremity of the extending part 84 there is a bolt hole 90 and upwardly turned lips 91 and 92 which serve to position and hold this part relative to the bottom 93 of the box frame member 12 as may be seen in FIG. 2. The part 84 is bolted to the bottom 93 of the box frame member 12 by way of the bolt designated at 94. The upper end of the regular spring 40 is retained underneath the part 84 of bracket 56 and box spring 12 and further spring retainer member may be provided to retain the upper end of this spring secured by the bolt 94.

As stated, the lower end of spring 50 is retained by the saddle member or assembly 52. This assembly comprises a saddle part 100 which extends transversely to the axle housing 14 and having end extensions or wings 101 and 102 which are slotted to receive the ends of the yoke or shackle 104, the ends of which are threaded and which forms a hanger passing underneath the housing 14, as may be seen in FIG. 2. At the upper part of the saddle 100 is a cylindrical integral retainer configuration 106 and the lower end of spring 50 fits around it. The saddle 100 has a central bore 108 to receive a bolt or screw 110. Numeral 112 designates a conical arm or bumper having a metal insert 114 having a threaded bore to receive the end of screw 110. The rubber bumper 112 replaces the regular bumpers which are removed for purposes of installation of the herein invention. When the saddle retainer assembly 52 is assembled as illustrated in FIG. 2, the ends of the hanger or shackle 104 extend through the slotted wings 101 and 102 of the saddle 100 and there they are retained by washers and nuts, as designated at 120 and 121. The screw 110 extends through the saddle and is threaded into the insert 114 in the bumper 112 so that the parts appear as in FIG. 2, the bumper serving to limit downward movement of the bracket or holder 56.

From the foregoing those skilled in the art will readily understand how the installation is made. The bracket 56 is bolted to the bracket 60 which in the vehicle referred to is already available at the sides of the frame members 10 and 12. The forwardly extending plate or platform 84 is fitted underneath the box frame member above the end of the regular spring 40 or between the bottom of the box frame member and the separate retaining bracket that may be available at the upper end of spring 40. The saddle assembly 52 is assembled to the rear axle shaft housing 14 as described above and the spring 50 positioned as shown in FIG. 2 between this saddle assembly or spring retainer and the upper bracket 56.

From the foregoing those skilled in the art will readily understand the nature of the invention and the manner in which it achieves and realizes the objectives and capabilities herein referred to in the foregoing. By reason of the additional springs the load-carrying capability of the vehicle is improved and enhanced particularly if the vehicle is adapted for use as a camper. The auxiliary installation is particularly effective by reason of the fact that the auxiliary springs are spaced outwardly and are further apart than the regular springs and the stability of the vehicle, particularly when subjected to wind conditions, is considerably enhanced and improved. The improvement is further enhanced in those vehicles wherein the regular springs are positioned forwardly of the rear axle housing.

The foregoing disclosure is representative of the preferred form of the invention and is to be interpreted in an illustrative rather than a limiting sense, the invention to be accorded the full scope of the claims appended hereto.

I claim:

1. In an automotive vehicle having a chassis, a rigid axle below and extending transversely of and beyond the sides of said chassis, and main suspension coil springs between said chassis and axle adjacent the sides of the chassis for resiliently supporting said chassis on said axle, the improvements comprising:
   auxiliary coil springs over said axle laterally outboard of said main suspension springs,
   means mounting the lower ends of said auxiliary springs to said axle, and
   brackets on said chassis at opposite sides thereof over said auxiliary springs for seating contact with the upper ends of said auxiliary springs.

2. The improvements according to claim 1, wherein:
   said auxiliary spring mounting means comprise means securing the lower ends of said auxiliary springs to said axle.

3. The improvements of claim 2 wherein:
   the upper ends of said auxiliary springs are spaced from said brackets under relatively light vehicle loading conditions, whereby increased loading of the vehicle comprises said main suspension springs to lower said brackets into contact with said auxiliary springs and subsequent compression of said auxiliary springs to aid said main suspension springs.

4. The improvements of claim 3 wherein:
   said auxiliary spring securing means comprising saddles positioned over said axle and seating the lower ends of said auxiliary springs, and U-bolts extending under said axle and secured to said saddles.

5. The improvements of claim 3 wherein:
   said chassis has longitudinal frame members along the sides thereof over said main suspension springs, and
   said brackets have normally vertical flanges seating against the outer sides of said frame members, normally horizontal flanges seating against the under sides of said frame members, and means securing said flanges to said frame members.

6. An auxiliary spring assembly for an automotive vehicle having a chassis, a rigid axle below and extending transversely of and beyond the sides of said chassis, and main suspension coil springs between said chassis and axle adjacent the sides of the chassis for resiliently supporting said chassis on said axle, comprising:
   an auxiliary coil spring having normally upper and lower ends,
   means for securing the lower end of said spring to the vehicle axle, and
   a bracket separate from said spring having means for securing the bracket to the vehicle chassis of said spring for seating contact with the upper end of said spring upon deflection of said chassis toward said axle.

7. An auxiliary spring assembly according to claim 6, wherein:
   said securing means comprises a saddle for engaging of said vehicle axle, and a U-bolt removably secured to said saddle for extension around the under side of said axle.

8. An auxiliary spring assembly according to claim 6 wherein:
   said bracket has a normally vertical flange for seating against one side of said chassis, a normally horizontal flange for seating against the under side of said chassis, and means for securing said flanges to said chassis.

* * * * *